(12) United States Patent
Hoover et al.

(10) Patent No.: US 7,958,340 B2
(45) Date of Patent: *Jun. 7, 2011

(54) MONITORING SOFTWARE PIPELINE PERFORMANCE ON A NETWORK ON CHIP

(75) Inventors: Russell D. Hoover, Rochester, MN (US); Eric O. Mejdrich, Rochester, MN (US); Paul E. Schardt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/117,875

(22) Filed: May 9, 2008

(65) Prior Publication Data

US 2009/0282227 A1 Nov. 12, 2009

(51) Int. Cl.
*G06F 9/38* (2006.01)
*G06F 15/173* (2006.01)

(52) U.S. Cl. ........................ 712/219; 709/224

(58) Field of Classification Search .............. 712/219; 709/224

See application file for complete search history.

(56) References Cited

U.S. PATENT DOCUMENTS

| | | | |
|---|---|---|---|
| 4,813,037 A | 3/1989 | Debuysscher et al. |
| 5,761,516 A | 6/1998 | Rostoker et al. |
| 5,870,479 A | 2/1999 | Feiken et al. |
| 5,884,060 A | 3/1999 | Vegesna et al. |
| 5,974,498 A | 10/1999 | Hartmann |
| 6,047,122 A | 4/2000 | Spiller |
| 6,085,315 A | 7/2000 | Fleck et al. |
| 6,101,599 A | 8/2000 | Wright et al. |
| 6,145,072 A | 11/2000 | Shams et al. |
| 6,151,668 A | 11/2000 | Pechanek et al. |
| 6,292,888 B1 | 9/2001 | Nemirovsky et al. |
| 6,561,895 B2 | 5/2003 | Scales |
| 6,567,895 B2 | 5/2003 | Scales |
| 6,668,308 B2 | 12/2003 | Barroso et al. |
| 6,675,284 B1 | 1/2004 | Warren |
| 6,725,317 B1 | 4/2004 | Bouchier et al. |
| 6,823,429 B1 | 11/2004 | Olnowich |
| 6,891,828 B2 | 5/2005 | Ngai |
| 6,915,402 B2 | 7/2005 | Wilson et al. |
| 6,950,438 B1 | 9/2005 | Owen et al. |
| 6,973,032 B1 | 12/2005 | Casley et al. |
| 6,988,149 B2 | 1/2006 | Odenwald |

(Continued)

OTHER PUBLICATIONS

U.S. Appl. No. 12/117,897, filed May 9, 2008, Hoover, et al.

(Continued)

*Primary Examiner* — Daniel Pan
(74) *Attorney, Agent, or Firm* — Biggers & Ohanian, LLP

(57) ABSTRACT

Software pipelining on a network on chip ('NOC'), the NOC including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. Embodiments of the present invention include implementing a software pipeline on the NOC, including segmenting a computer software application into stages, each stage comprising a flexibly configurable module of computer program instructions identified by a stage ID; executing each stage of the software pipeline on a thread of execution on an IP block; monitoring software pipeline performance in real time; and reconfiguring the software pipeline, dynamically, in real time, and in dependence upon the monitored software pipeline performance.

16 Claims, 7 Drawing Sheets

U.S. PATENT DOCUMENTS

| | | | |
|---|---|---|---|
| 7,072,996 | B2 | 7/2006 | Adusumilli et al. |
| 7,162,560 | B2 | 1/2007 | Taylor et al. |
| 7,376,789 | B2 | 5/2008 | Halleck et al. |
| 7,394,288 | B1* | 7/2008 | Agarwal ............ 326/39 |
| 7,398,374 | B2 | 7/2008 | DeLano |
| 7,464,197 | B2 | 12/2008 | Ganapathy et al. |
| 7,493,474 | B1 | 2/2009 | Pechanek et al. |
| 7,500,060 | B1 | 3/2009 | Anderson et al. |
| 7,502,378 | B2 | 3/2009 | Lajolo et al. |
| 7,521,961 | B1 | 4/2009 | Anderson et al. |
| 7,533,154 | B1 | 5/2009 | Chen et al. |
| 7,546,444 | B1 | 6/2009 | Wolrich et al. |
| 7,568,064 | B2 | 7/2009 | Reblewski et al. |
| 7,590,774 | B2 | 9/2009 | Johns et al. |
| 7,689,738 | B1 | 3/2010 | Williams et al. |
| 2002/0099833 | A1 | 7/2002 | Steely et al. |
| 2002/0178337 | A1* | 11/2002 | Wilson et al. ............ 711/173 |
| 2003/0065890 | A1 | 4/2003 | Lyon |
| 2004/0083341 | A1 | 4/2004 | Robinson et al. |
| 2004/0088487 | A1 | 5/2004 | Barroso et al. |
| 2004/0151197 | A1 | 8/2004 | Hui |
| 2004/0250046 | A1 | 12/2004 | Gonzalez et al. |
| 2004/0260906 | A1 | 12/2004 | Landin et al. |
| 2005/0166205 | A1* | 7/2005 | Oskin et al. .............. 718/103 |
| 2005/0198442 | A1 | 9/2005 | Mandler |
| 2005/0203988 | A1 | 9/2005 | Nolle et al. |
| 2005/0238035 | A1 | 10/2005 | Riley |
| 2006/0209846 | A1 | 9/2006 | Clermidy et al. |
| 2006/0242393 | A1 | 10/2006 | Park et al. |
| 2007/0055826 | A1 | 3/2007 | Morton et al. |
| 2007/0076739 | A1 | 4/2007 | Manjeshwar et al. |
| 2008/0134191 | A1 | 6/2008 | Warrier et al. |
| 2008/0186998 | A1 | 8/2008 | Rijpkerna |
| 2009/0083263 | A1* | 3/2009 | Felch et al. ............ 707/5 |
| 2009/0282222 | A1* | 11/2009 | Hoover et al. ............ 712/220 |

OTHER PUBLICATIONS

U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Office Action Dated Jan. 29, 2010 in U.S. Appl. No. 11/945,396.
Final Office Action Dated Jan. 15, 2010 in U.S. Appl. No. 12/031,733.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
INTEL, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Virtanen, et al. "NoC Interface for a Protocol Processor". University of Turku.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.
Steve Furber, Future Trends in SOC Interconnect, Aug. 2000.
Bolotin, et al., The Power of Priority:NoC based Distributed Cache Coherency, May 21, 2007, IEEE, pp. 117-126.
Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Issenin et al.; (Date Reuse Driven Memory and network-on-Chip Co-Synthesis); NSF; pp. 1-7.
Kavaldijev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Al-Hashimi; ("System-on-Chip- Net Generation Electronics", "Asynchronous on-chip networks" 2006); Chapter 18 p. 1-32.
Final Office Action, U.S. Appl. No. 11/926,212, mailed Aug. 23, 2010.
Final Office Action, U.S. Appl. No. 11/955,553, mailed Sep. 13, 2010.
Final Office Action, U.S. Appl. No. 12/031,733, mailed Aug. 19, 2010
Notice of Allowance, U.S. Appl. No. 12/118,298, mailed Aug. 18, 2010.
Office Action, U.S. Appl. No. 11/972,753, mailed Oct. 4, 2010.
Office Action, U.S. Appl. No. 12/015,975, mailed Jul. 22, 2010.
Office Action, U.S. Appl. No. 11/937,579, mailed Sep. 16, 2010.
Office Action, U.S. Appl. No. 12/118,059, mailed Sep. 1, 2010.
Office Action, U.S. Appl. No. 12/121,168, mailed Oct. 5, 2010.
Nikolay Kvaldjiev et al., A Virtual Channel Network-on-chip for GT and BE traffic, Apr. 2006, IEEE Emerging VLSI Technologies and Architectures.
Office Action, U.S. Appl. No. 11/926,212, mailed Dec. 7, 2010.
Office Action, U.S. Appl. No. 11/945,396, mailed Dec. 9, 2010.
Notice of Allowance, U.S. Appl. No. 11/955,553, mailed Nov. 22, 2010.
Notice of Allowance, U.S. Appl. No. 12/031,733, mailed Nov. 16, 2010.
Office Action, U.S. Appl. No. 12/118,017, mailed Dec. 8, 2010.
Office Action, U.S. Appl. No. 12/118,272, mailed Dec. 2, 2010.
Office Action, U.S. Appl. No. 12/108,846, mailed Dec. 2, 2010.
Final Office Action, U.S. Appl. No. 12/117,875, mailed Nov. 10, 2010.
Office Action, U.S. Appl. No. 12/117,906, mailed May 9, 2008.
Office Action, U.S. Appl. No. 12/060,559, mailed Nov. 3, 2010.
Advisory Action, U.S. Appl. No. 11/926,212, mailed Nov. 2, 2010.

* cited by examiner

US 7,958,340 B2

MONITORING SOFTWARE PIPELINE PERFORMANCE ON A NETWORK ON CHIP

BACKGROUND OF THE INVENTION

1. Field of the Invention

The field of the invention is data processing, or, more specifically apparatus and methods for data processing with a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

Methods and products for software pipelining on a network on chip ('NOC'), are disclosed the NOC comprising integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. Embodiments of the present invention include: implementing a software pipeline on the NOC, including segmenting a computer software application into stages, each stage comprising a flexibly configurable module of computer program instructions identified by a stage 1D; executing each stage of the software pipeline on a thread of execution on an IP block; monitoring software pipeline performance in real time; and reconfiguring the software pipeline, dynamically, in real time, and in dependence upon the monitored software pipeline performance.

A network on chip ('NOC') for software pipelining is also disclosed, the NOC including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. The NOC includes a software pipeline comprising a computer software application segmented into stages, each stage comprising a flexibly configurable module of computer program instructions identified by a stage 1D; each stage executing on a thread of execution on an IP block; software pipeline performance on the NOC monitored in real time; and the software pipeline dynamically reconfigured in real time in dependence upon the monitored software pipeline performance.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
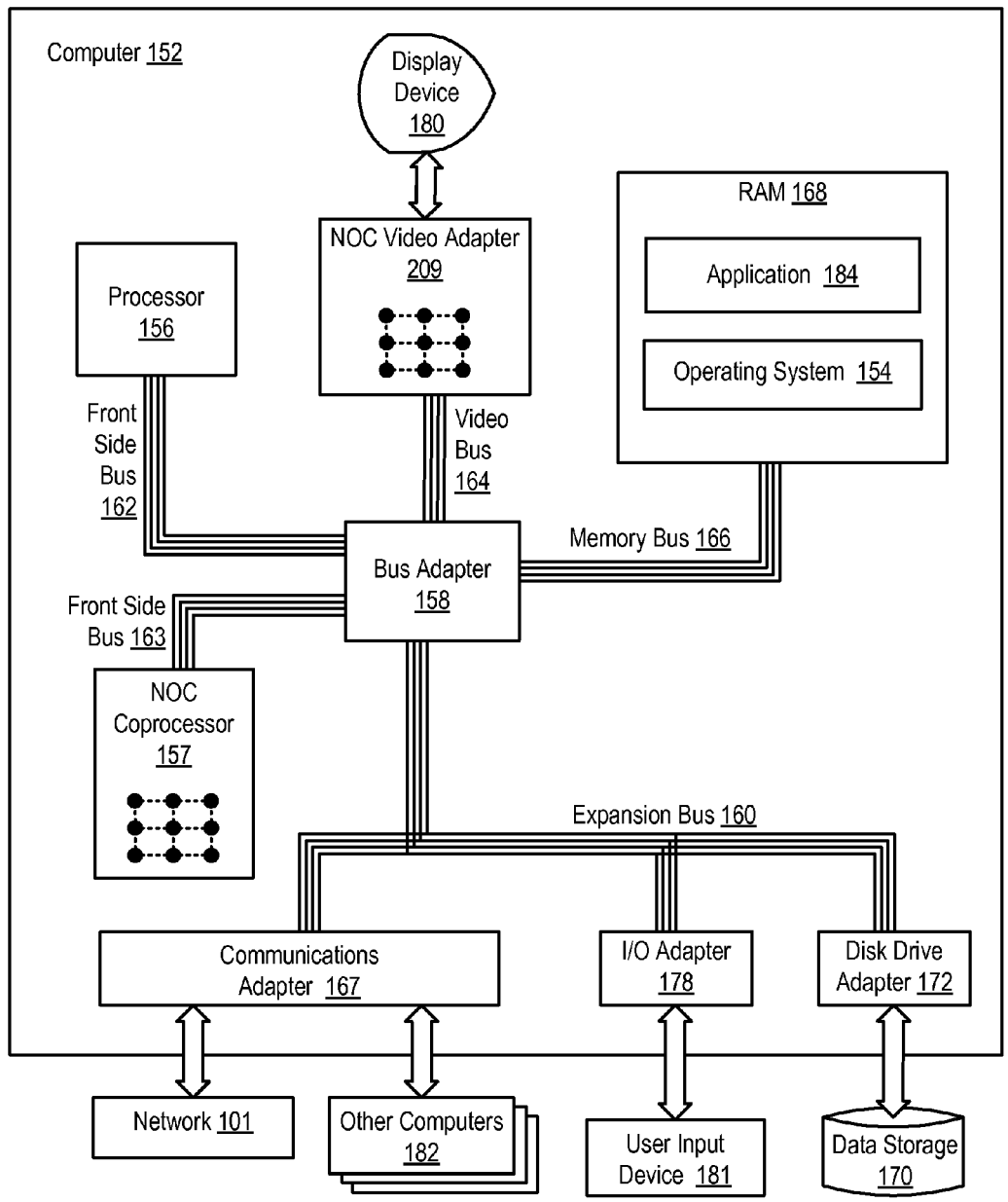
FIG. 1 sets forth a block diagram of automated computing machinery comprising an exemplary computer useful in data processing with a NOC according to embodiments of the present invention.

Exemplary apparatus and methods for data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. The NOC video adapter and the NOC coprocessor are optimized for programs that use parallel processing and also require fast random access to shared memory. The details of the NOC structure and operation are discussed below with reference to FIGS. 2-4.

Software pipelining on a NOC in accordance with embodiments of the present invention may be implemented in either NOCs (209, 157) in the exemplary computer (152) of FIG. 1. Software pipelining on such a NOC (209,157) in accordance with embodiments of the present invention may be carried out by: implementing a software pipeline on the NOC (209,157), including segmenting a computer software application (184) into stages, each stage including a flexibly configurable module of computer program instructions identified by a stage 1D; executing each stage of the software pipeline on a thread of execution on an IP block; monitoring software pipeline performance in real time; and reconfiguring the software pipeline, dynamically, in real time, and in dependence upon the monitored software pipeline performance.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
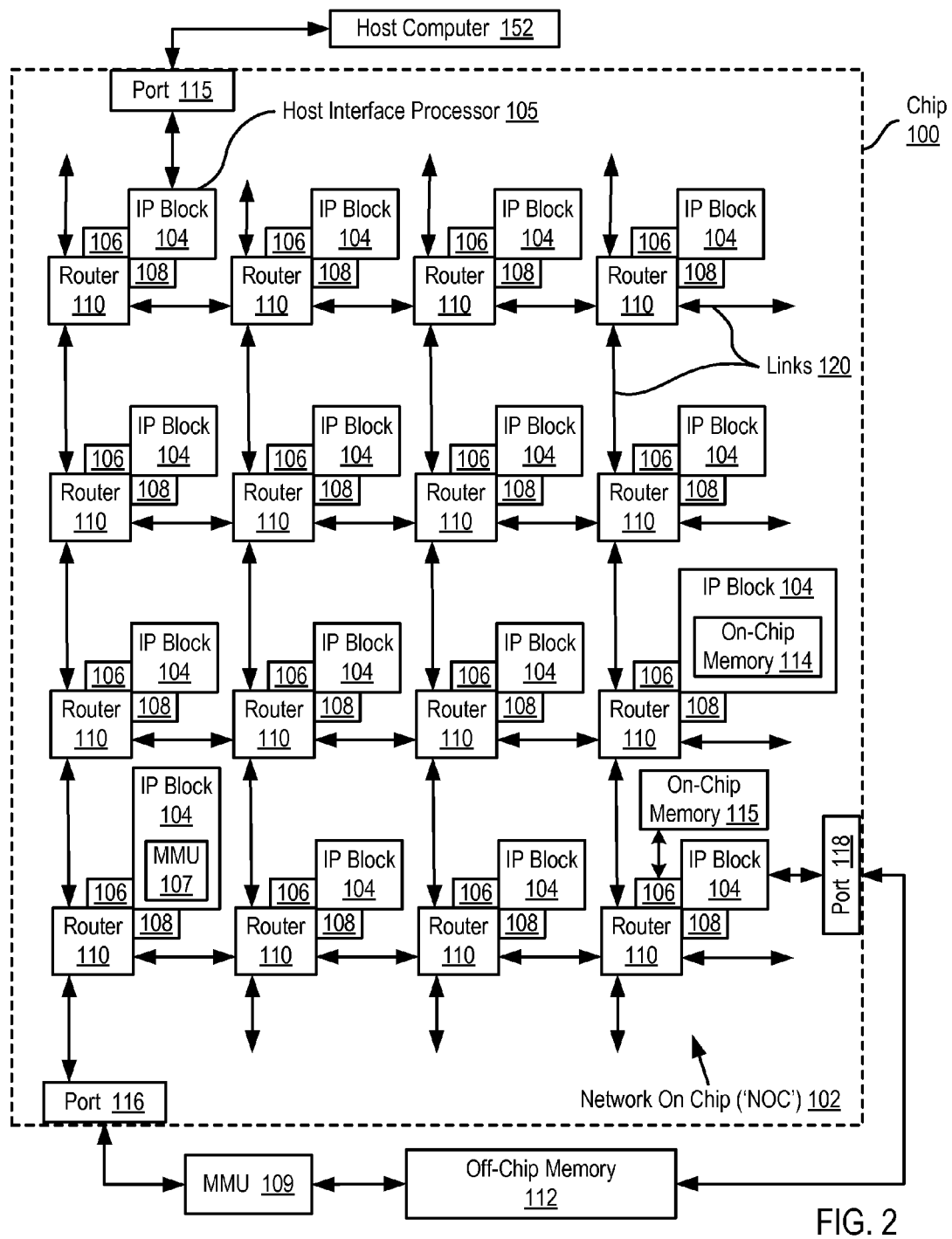
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packet structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (107, 109), illustrating two alternative memory architectures for NOCs according to embodiments of the present invention. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Software pipelining on a NOC in accordance with embodiments of the present invention may be implemented in the NOC (102) of FIG. 2. Software pipelining on a NOC in accordance with embodiments of the present invention includes: implementing a software pipeline on the NOC, including segmenting a computer software application into stages, each stage including a flexibly configurable module of computer program instructions identified by a stage 1D; executing each stage of the software pipeline on a thread of execution on an IP block; monitoring software pipeline performance in real time; and reconfiguring the software pipeline, dynamically, in real time, and in dependence upon the monitored software pipeline performance.

Figure 3:
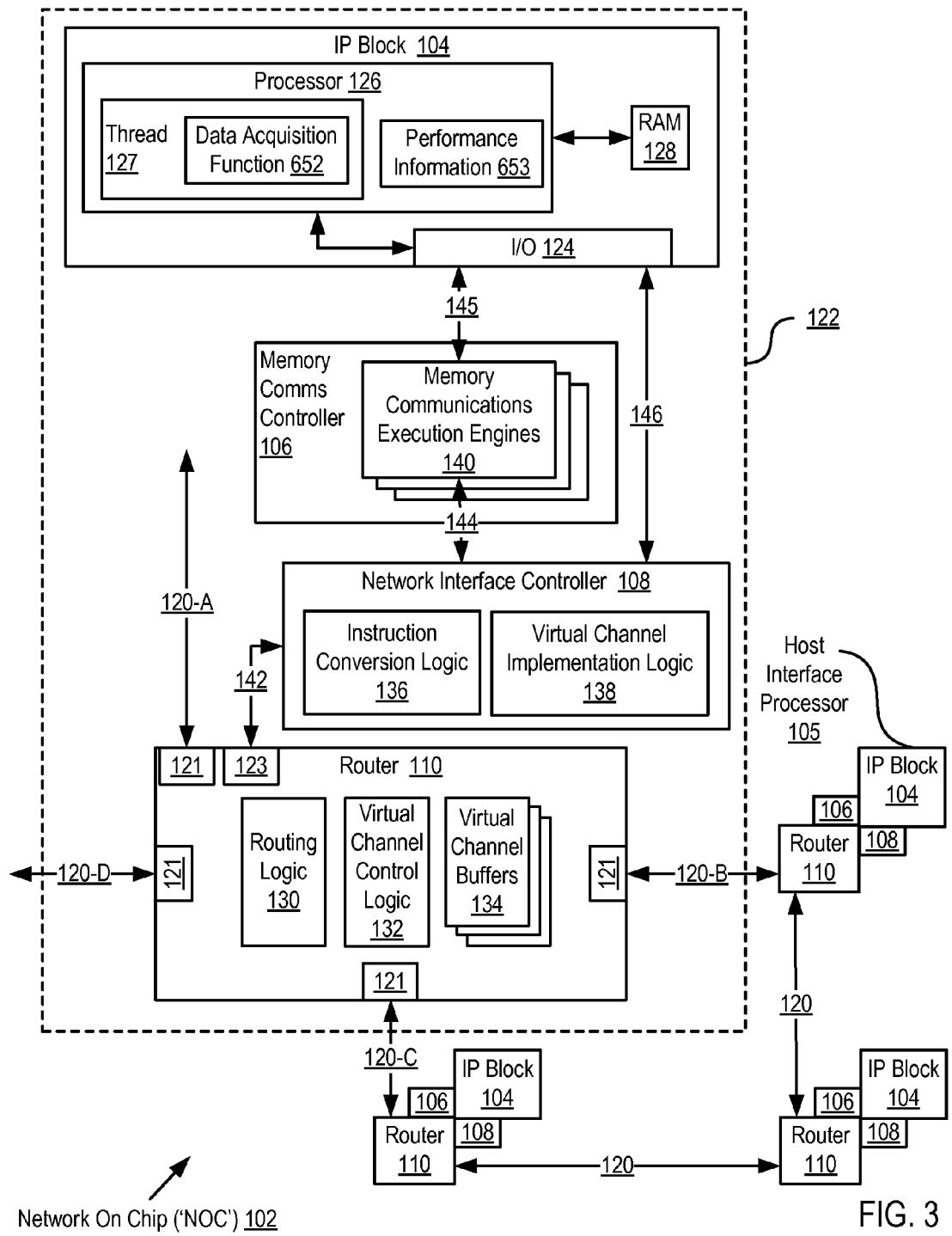
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

Software pipelining in accordance with embodiments of the present invention may be implemented on the NOC (102) of FIG. 3. Software pipelining on such a NOC (102) in accordance with embodiments of the present invention includes implementing a software pipeline on the NOC (102), including segmenting a computer software application into stages, each stage comprising a flexibly configurable module of computer program instructions identified by a stage 1D; executing each stage of the software pipeline on a thread (127) of execution on an IP block (104); monitoring software pipeline performance in real time; and reconfiguring the software pipeline, dynamically, in real time, and in dependence upon the monitored software pipeline performance.

Monitoring software pipeline performance may be carried out during predefined monitoring periods by acquiring, by a data acquisition function (652) of a thread (127) on an IP block (104) in the software pipeline, performance information (653) from the IP block hardware during each monitoring period; and providing by the thread (127) the performance information (653) to a monitor function in a host interface processor (105) during each monitoring period. Such performance information may include inter-thread communications rates, memory traffic information, compute density of thread (127), and others as will occur to those of skill in the art.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through its I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
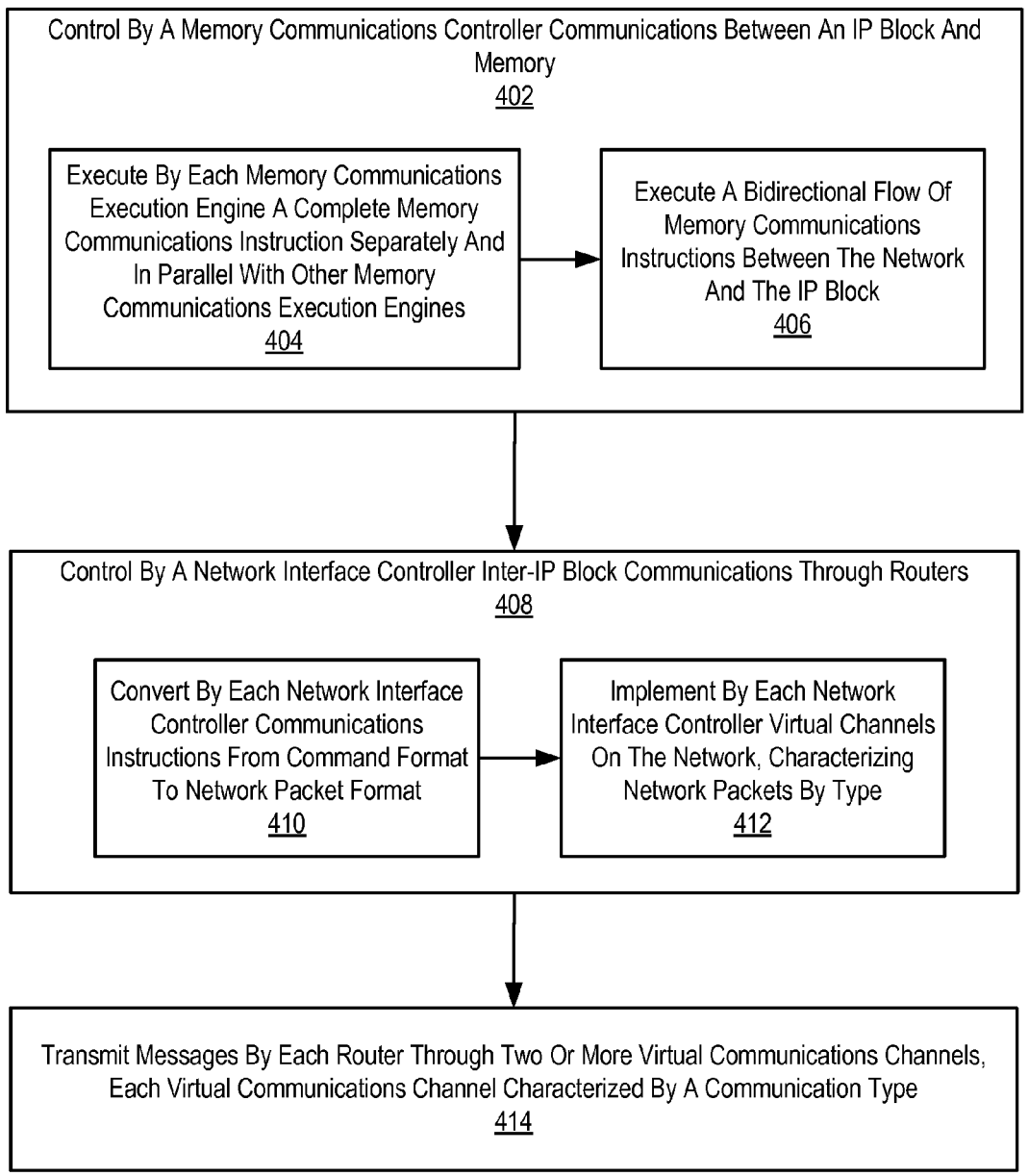
FIG. 4 sets forth a flow chart illustrating an exemplary method for data processing with a NOC according to embodiments of the present invention.

For further explanation, FIG. 4 sets forth a flow chart illustrating an exemplary method for data processing with a NOC according to embodiments of the present invention. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 also includes controlling (408) by a network interface controller (108 on FIG. 3) inter-IP block communications through routers. In the method of FIG. 4, controlling (408) inter-IP block communications also includes converting (410) by each network interface controller communications instructions from command format to network packet format and implementing (412) by each network interface controller virtual channels on the network, including characterizing network packets by type.

The method of FIG. 4 also includes transmitting (414) messages by each router (110 on FIG. 3) through two or more virtual communications channels, where each virtual communications channel is characterized by a communication type.

Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

On a NOC according to embodiments of the present invention, computer software applications may be implemented as software pipelines. For further explanation, FIG. 5 sets forth a data flow diagram illustrating operation of an example software pipeline (600) according to embodiments of the present invention. The example software pipeline (600) of FIG. 5 includes three stages (602, 604, 606) of execution. A software pipeline is a computer software application that is segmented into a set of modules or 'stages' of computer program instructions that cooperate with one another to carry out a series of data processing tasks in sequence. Each stage in a software pipeline is composed of a flexibly configurable module of computer program instructions identified by a stage 1D with each stage executing on a thread of execution on an IP block on a NOC. The stages are 'flexibly configurable' in that each stage may support multiple instances of the stage, so that a software pipeline may be scaled by instantiating additional instances of a stage as needed depending on workload.

Figure 5:
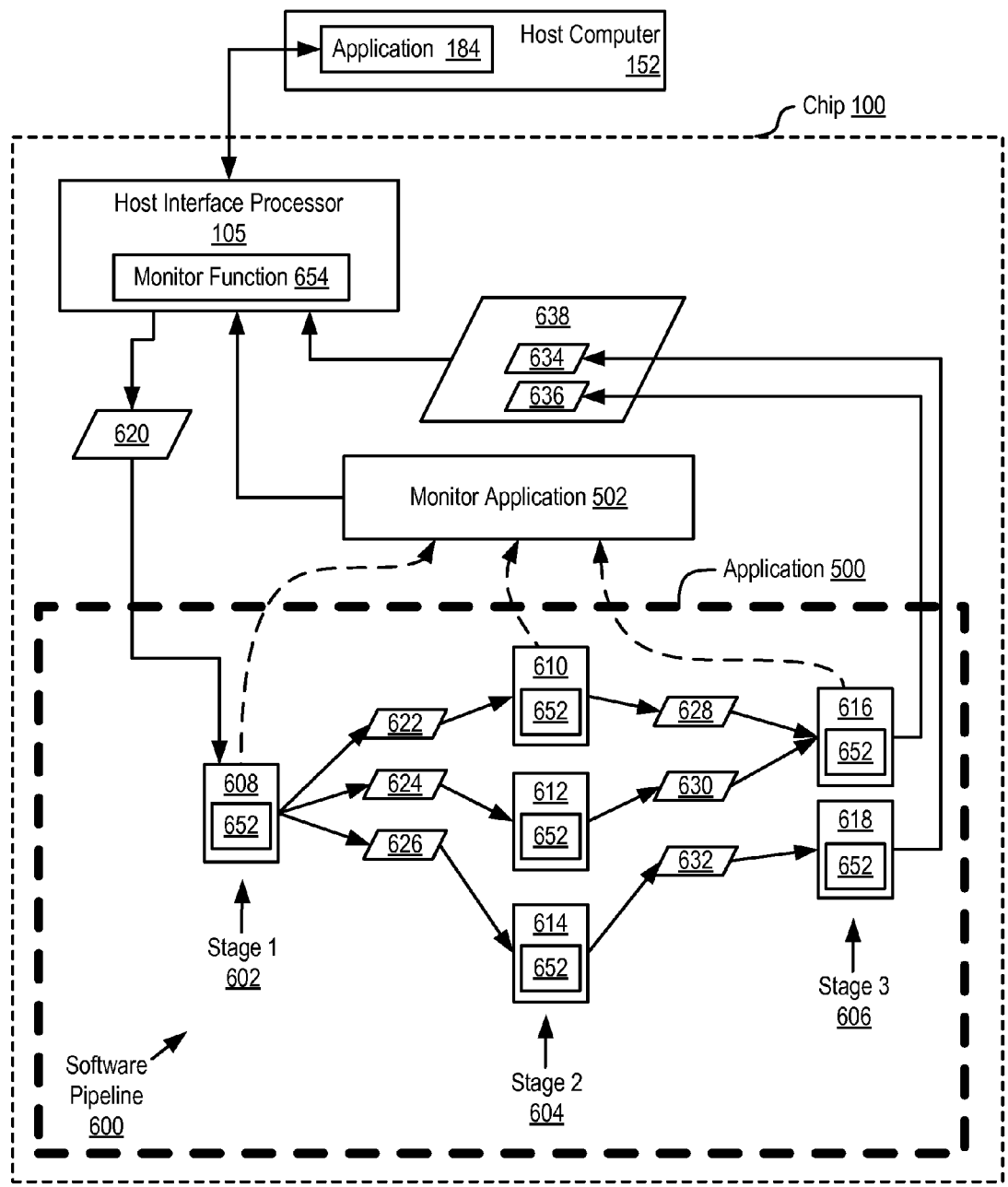
FIG. 5 sets forth a data flow diagram an example software pipeline on a NOC according to embodiments of the present invention.

Because each stage (602, 604, 606) is implemented by computer program instructions executing on an IP block (104 on FIG. 2) of a NOC (102 on FIG. 2), each stage (602, 604, 606) is capable of accessing addressed memory through a memory communications controller (106 on FIG. 2) of an IP block—with memory-addressed messages as described above. At least one stage, moreover, sends network-address based communications among other stages, where the network-address based communications maintain packet order. In the example of FIG. 5, both stage 1 and stage 2 send network-address based communications among stages, stage 1 sending network address based communications (622-626) from stage 1 to stage 2, stage 2 sending network addressed communications (628-632) to stage 3.

The network-address based communications (622-632) in the example of FIG. 5 maintain packet order. Network-address based communications among stages of a pipeline are all communications of a same type which therefore flow through the same virtual channel as described above. Each packet in such communications is routed by a router (110 on FIG. 3) according to embodiments of the present invention, entering and leaving a virtual channel buffer (134 on FIG. 3) in sequence, in FIFO order, first-in, first-out, thereby maintaining strict packet order. Maintaining packet order in network address based communications according to the present invention provides message integrity because the packets are received in the same order in which they are—eliminating the need for tracking packet sequence in a higher layer of the data communication protocol stack. Contrast the example of TCP/IP where the network protocol, that is, the Internet Protocol, not only makes no undertaking regarding packet sequence, but in fact normally does deliver packets out of order, leaving it up to the Transmission Control Protocol in a higher layer of the data communication protocol stack to put the packets in correct order and deliver a complete message to the application layer of the protocol stack.

Each stage of the software pipeline implements a producer/consumer relationship with a next stage. Stage 1 receives work instructions and work piece data (620) through a host interface processor (105) from an application (184) running on a host computer (152). Stage 1 carries out its designated data processing tasks on the work piece, produces output data, and sends the produced output data (622, 624, 626) to stage 2, which consumes the produced output data from stage 1 by carrying out its designated data processing tasks on the produced output data from stage 1, thereby producing output data from stage 2, and sends its produced output data (628, 630, 632) to stage 3, which in turn consumes the produced output data from stage 2 by carrying out its designated data processing tasks on the produced output data from stage 2, thereby producing output data from stage 3, which then stores its produced output data (634, 636) in an output data structure (638) for eventual return through the host interface processor (105) to the originating application program (184) on the host computer (152).

The return to the originating application program is said to be 'eventual' because quite a lot of return data may need to be calculated before the output data structure (638) is ready to return. The pipeline (600) in this example is represented with only six instances (622-632) in three stages (602-606). Many pipelines according to embodiments of the present invention, however, may includes many stages and many instances of stages. In an atomic process modeling application, for example, the output data structure (638) may represent the state at a particular nanosecond of an atomic process containing the exact quantum state of billions of sub-atomic particles, each of which requires thousands of calculations in various stages of a pipeline. Or in a video processing application, for a further example, the output data structure (638) may represent a video frame composed of the current display state of thousands of pixels, each of which requires many calculations in various stages of a pipeline.

Each instance (622-632) of each stage (602-606) of the pipeline (600) is implemented as an application-level module of computer program instructions executed on a separate IP block (104 on FIG. 2) on a NOC (102 on FIG. 2). Each stage is assigned to a thread of execution on an IP block of a NOC. Each stage is assigned a stage 1D, and each instance of a stage is assigned an identifier. The pipeline (600) is implemented in this example with one instance (608) of stage 1, three instances (610, 612, 614) of stage 2, and two instances (616, 618) of stage 3. Stage 1 (602, 608) is configured at start-up by the host interface processor (105) with the number of instances of stage 2 and the network location of each instance of stage 2. Stage 1 (602, 608) may distribute its resultant workload (622, 624, 626) by, for example, distributing it equally among the instances (610-614) of stage 2. Each instance (610-614) of stage 2 is configured at start up with the network location of each instance of stage 3 to which an instance of stage 2 is authorized to send its resultant workload. In this example, instances (610, 612) are both configured to send their resultant workloads (628, 630) to instance (616) of stage 3, whereas only one instance (614) of stage 2 sends work (632) to instance (618) of stage 3. If instance (616) becomes a bottleneck trying to do twice the workload of instance (618), an additional instance of stage 3 may be instantiated, even in real time at run time if needed.

In the example of FIG. 5, where a computer software application (500) is segmented into stages (602, 604, 606), each stage may be configured with a stage 1D for each instance of a next stage. That a stage may be configured with a stage 1D for a next stage means that a stage is provided with an identifier for each instance of a next stage, with the identifier stored in memory available to the stage. Configuring with identifiers of instances of next stage can include configuring with the number of instances of a next states as well as the network location of each instance of a next stage, as mentioned above. The single instance (608) of stage 1, in the current example, may be configured with a stage identifier or 'ID' for each instance (610-614) of a next stage, where the 'next stage' for stage 1, of course, is stage 2. The three instances (610-614) of stage 2 each may be configured with a stage 1D for each instance (616, 618) of a next stage, where the next stage for stage 2 naturally is stage 3. And so on, with stage 3 in this example representing the trivial case of a stage having no next stage, so that configuring such a stage with nothing represents configuring that stage with the stage 1D of a next stage.

Configuring a stage with IDs for instances of a next stage as described here provides the stage with the information needed to carry out load balancing across stages. In the pipeline of FIG. 5, for example, where a computer software application (500) is segmented into stages, the stages are load balanced with a number of instances of each stage in dependence upon the performance of the stages. Such load balancing can be carried out, for example, by monitoring the performance of the stages and instantiating a number of instances of each stage in dependence upon the performance of one or more of the stages. Monitoring the performance of the stages for load balancing can be carried out by configuring each stage to report performance statistics to a monitor application (502) that in turn is installed and running on another thread of execution on an IP block or host interface processor. Performance statistics can include, for example, time required to complete a data processing task, a number of data processing tasks completed within a particular time period, and so on, as will occur to those of skill in the art.

Instantiating a number of instances of each stage in dependence upon the performance of one or more of the stages can be carried out by instantiating, by a host interface processor (105), a new instance of a stage when monitored performance indicates a need for a new instance. As mentioned, instances (610, 612) in this example are both configured to send their resultant workloads (628, 630) to instance (616) of stage 3, whereas only one instance (614) of stage 2 sends work (632) to instance (618) of stage 3. If instance (616) becomes a bottleneck trying to do twice the workload of instance (618), an additional instance of stage 3 may be instantiated, even in real time at run time if needed.

In the example of FIG. 5, where a computer software application (500) is segmented into stages (602-606), software pipeline performance may be monitored in real time, and the software pipeline may be dynamically reconfigured, in real time, in dependence upon the monitored software pipeline (600) performance. Reconfiguring a software pipeline (600) is carried out 'dynamically' in accordance with embodiments of the present invention in that software pipeline (600) performance may continually vary throughout execution of the application (500) and reconfiguration of the software pipeline (600) occurs when necessary.

The term 'real time' is used here to describe monitoring and reconfiguration of a software pipeline (600) in a NOC such that monitoring and reconfiguration of the software pipeline (600) occurs or is carried out by a certain point in time. This point in time may be a defined time, such as 12:01:23.25. This point in time may also be a point in time, not in terms of time as such, but in terms of an occurrence of an event such as, for example, a time for a next video frame buffer to be filled and displayed. The term 'real time' may also be used to describe monitoring and reconfiguration of a software pipeline from a human perspective of the operation of a NOC. That is, 'real time' monitoring and reconfiguration of a software pipeline in a NOC in accordance with embodiments of the present invention is carried out such that, from a human perspective, operation of the NOC is not interrupted. Consider, for example, a NOC having a software pipeline for filling a video frame buffer and displaying the video frame. 'Real time' monitoring and reconfiguration of such a software pipeline in accordance with embodiments of the present invention is carried out such that, from a human perspective, the video display frame rate does not vary or varies insignificantly. Readers of skill in the art will recognize that although monitoring and reconfiguration of a software pipeline on a NOC are described here as 'real time,' any type of application, whether real time or non-real-time, may be a candidate, when implemented as a software pipeline on a NOC, for real time monitoring and reconfiguration in accordance with embodiments of the present invention.

In the example of FIG. 5, monitoring software pipeline (600) performance in real time may include monitoring software pipeline (600) performance during predefined monitoring periods. A predefined monitoring period may be a number of execution cycles of a processor, a number of milliseconds, an event based time period, such as, for example, a time period for a vertical retrace, or any other time period as will occur to readers of skill in the art. One or more monitoring periods may be followed by a reconfiguration period, a time in which the host interface processor reconfigures the software pipeline (600), upon a determination by the monitor function in the host interface processor that reconfiguration is necessary. In the example of FIG. 5, one or more monitoring periods may pass before a software pipeline (600) is reconfigured.

Monitoring software pipeline (600) performance in real time during monitoring periods may include acquiring, by a data acquisition function (652) of a thread on an IP block in the software pipeline (600), performance information from the IP block hardware during each monitoring period and providing by the thread the performance information to a monitor function (654) during each monitoring period. A data acquisition function (652) is a module of computer program instructions that acquires performance information from IP block hardware and provides such information to a monitor function (654) in a host interface processor. Performance information of IP block hardware executing threads in the example of FIG. 5 includes the compute density of a thread, inter-thread communication rates among threads running instances of stages of the software pipeline (600), and memory traffic in the NOC.

Monitoring software pipeline (600) performance in real time during monitoring periods in the example of FIG. 5 may also include providing by the thread the performance information to a monitor function (654) in the host interface processor (105) during each monitoring period. The monitor function (654) in the example of FIG. 5 is a module of computer program instructions capable of receiving performance information from one or more threads of a software pipeline (600) on IP blocks; determining in dependence upon the received performance information whether to reconfigure the software pipeline (600); and reconfiguring the software pipeline (600), dynamically, in real time.

In addition to monitoring software pipeline (600) performance in real time during monitoring periods, monitoring software pipeline (600) performance in real time in the example of FIG. 5 may also include monitoring compute density of a thread; monitoring inter-thread communications rates among threads running instances of stages of the software pipeline (600); and monitoring memory traffic in the NOC.

In the example of FIG. 5, compute density of a thread is the number of computer program instructions executed per processor cycle in a processor of an IP block on which the thread is running. An idle thread may execute relatively few instructions per processor cycle while an overloaded thread may execute a relatively high number of instructions per processor cycle.

Inter-thread communication rates among threads running instances of stages of the software pipeline (600) in the example of FIG. 5 may include wait time for sending a packet, wait time for receiving a packet, bandwidth utilization in a virtual communications channel carrying data communications between threads, or a hardware measurement by a router of wait time for an arriving packet to be transmitted forward from the router on the network. A longer wait time for an arriving packet to be transmitted forward from the router on the network is an indication of packet contention in the router which, in turn, is an indication of network latency.

Wait time for sending a packet across the network may be a number of attempts to write a packet to an outbox or the time elapsed between the first, unsuccessful write attempt to the outbox and the last, successful write attempt to the outbox. When sending a packet across the network, a thread attempts a write to a message buffer referred to here as an outbox. If a write to the outbox is successful a flag bit indicating success is raised. If such a flag bit is not raised, the thread repeatedly attempts to write to the buffer until the write is successful. A long wait time for sending a packet across the network may be an indication of a high packet latency in a router between the sending thread's IP block and the next hop in the network path toward the destination of the packet or an overloaded receiving thread on another IP block.

Wait time for receiving a packet may be a number of attempts to read a packet from an inbox or the time elapsed between a first, unsuccessful read attempt from the inbox and the last, successful read attempt from the inbox. When receiving a packet, a thread attempts a read from a message buffer referred to here as an inbox. If the read from the inbox is successful a flag bit indicating success is raised. If such a flag bit is not raised, the thread repeatedly attempts to read from the buffer until the read is successful. A long wait time to read from an inbox may be an indication that network traffic between an IP block of a transmitting thread and an IP block of the receiving thread is high, or that packet latency in the receiving thread's network router is high.

Routers may maintain a measure of bandwidth utilization in a virtual communications channel carrying data communications between threads through use of associated shift registers and counters implemented in routing logic. The shift registers may include a separate shift register for each virtual communications channel for each link of each router. Each shift register shifts, at a periodic rate, such as a clock cycle, a value representing a transmission of at least a portion of a packet in a virtual communications channel on a link. That is, on each clock cycle for which a packet or portion of a packet is transmitted in a particular virtual communications channel, a value representing such a transmission is entered into the shift register. Such a value is shifted through the shift register on subsequent clock cycles. On each clock cycle for which no packet or portion of a packet is transmitted in the particular virtual communications channel, a value representing no transmission is entered into the shift register. Such a value is shifted through the shift register on subsequent clock cycles. Consider, as an example, that a 'one' bit represents a transmission of a packet or portion of a packet in a virtual communications channel, and a 'zero' bit represents no transmission of a packet or portion of a packet in a virtual communications channel. In such an example, a 'one' is entered into a shift register for each clock cycle that a packet or portion of packet is transmitted in a virtual communications channel, a 'zero' is entered into a shift register for each clock cycle that no packet or portion of a packet is transmitted in a virtual communications channel, and for each clock cycle, the values in the shift register are shifted.

Counters implemented in routing logic may include a counter for each virtual communications channel for each link of the router. Each counter may be incremented on each entry into a corresponding shift register of a value representing a transmission of a portion of a packet and each counter may be decremented upon exit from a corresponding shift register of a value representing a transmission of a portion of a packet. The value of the counter represents the total current bandwidth utilized by an associated virtual communications channel. A thread may report such current bandwidth utilization by retrieving the value of the counter from a hardware register and providing the value to the monitor function in the host interface processor. Alternatively, the monitor function may asynchronously or periodically poll all routers for current clock values, concatenate the values into a single word of information and transmitted in a communications packet to the monitor function on the host interface processor.

Memory traffic in the example of FIG. 5 includes cache miss rates. A high cache miss rate in an IP block of a thread executing an instance of a stage of a software pipeline (600) is an indication of high memory traffic in the network between the IP block and memory because cache misses typically necessitate a memory load by the IP block across the network to on-chip memory in the NOC or off-chip memory.

Readers of skill in the art will recognize that the host interface processor (105) through use of the monitor function (654) may use any combination of the previously mentioned performance information to determine whether to reconfigure the software pipeline (600). That is, the monitor function (654) may make inferences regarding the necessity of reconfiguration of the software pipeline (600) a combination of various types of performance information. Consider, for example, that the data acquisition function (652) of a thread executing an instance of stage of a software pipeline (600) on an IP block provides to the monitor function (654) performance information representing a high cache miss rate in the IP block. Consider also, that data acquisition functions (652) of all threads executing in the NOC provide to the monitor function (654) performance information representing low wait times of arriving packets to be transmitted forward from routers on the network. The monitor function (654) of the host interface processor (105), taking the high cache miss rate in the IP block alone, may infer high memory traffic in the NOC. In such a case, the monitor function (654) may determine that reconfiguration is necessary. In contrast, the monitor function (654), taking the high cache miss rate in combination with the low wait times for arriving packets to be transmitted forward from routers on the network, may instead infer that memory traffic is, in fact, not high in the NOC. In such a case, the monitor function (654) may determine that reconfiguration of the software pipeline (600) is unnecessary.

In the example of FIG. 5, reconfiguring the software pipeline (600) dynamically, in real time, and in dependence upon the monitored software pipeline (600) performance may include adding, to a pipeline stage having one or more overloaded threads, a thread to run an additional instance of the pipeline stage; moving an instance of a pipeline stage, the instance executing in a thread of execution on an IP block, to another thread of execution on another IP block; and reconfiguring a routing table to reduce packet contention on an overloaded router.

Adding, to a pipeline stage having one or more overloaded threads, a thread to run an additional instance of the pipeline stage may include adding a thread to an IP block not originally included in a hardware network designated for the software pipeline (600), a subnet. NOCs may support multiple hardware networks or 'subnets' which are defined by routing tables. Separate subnets may be tasked with executing separate applications or software pipelines for separate users. Adding a thread to an IP block not originally included in subnet designated for the software pipeline (600) may include reconfiguring routing tables to enable communications among threads executing instances of stages of the software pipeline (600) and the added thread executing the IP block not originally included in the subnet.

Moving an instance of a pipeline stage to another thread of execution on another IP block may reduce memory traffic. Different IP blocks executing threads of a software pipeline may be located in the network a different number of network hops from memory and as such may each experience different latency in memory communications. Moving an IP block having a high latency in memory communications closer to the memory may reduce the IP block's high memory latency.

Moving an instance of a pipeline stage to another thread of execution on another IP block may also reduce network latency for data communications to and from the instance of the pipeline stage. Reducing network latency for data communications to and from the instance of the pipeline stage may be carried out by moving the instance of the pipeline stage to another thread on an IP block such that the amount of data communications to and from the IP block that traverse overloaded routers is reduced.

Figure 6:
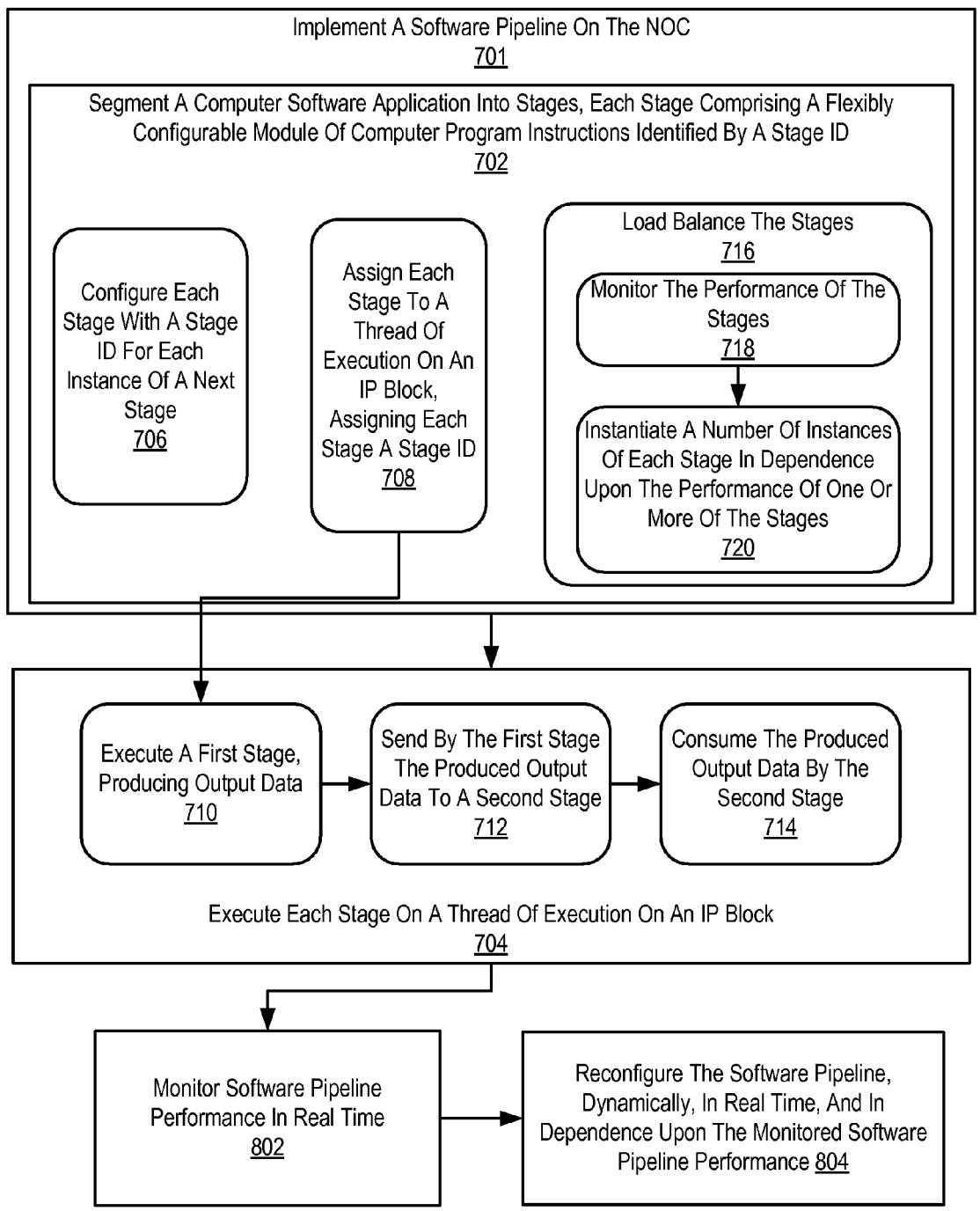
FIG. 6 sets forth a flow chart illustrating an exemplary method of software pipelining on a NOC according to embodiments of the present invention.

For further explanation, FIG. 6 sets forth a flow chart illustrating an exemplary method of software pipelining on a NOC according to embodiments of the present invention. The method of FIG. 6 is implemented on a NOC similar to the ones described above in this specification, a NOC (102 on FIG. 2) that is implemented on a chip (100 on FIG. 2) with IP blocks (104 on FIG. 2), routers (110 on FIG. 2), memory communications controllers (106 on FIG. 2), and network interface controllers (108 on FIG. 2). Each IP block (104 on FIG. 2) is adapted to a router (110 on FIG. 2) through a memory communications controller (106 on FIG. 2) and a network interface controller (108 on FIG. 2). In the method of FIG. 6, each IP block is implemented as a reusable unit of synchronous or asynchronous logic design used as a building block for data processing within the NOC.

The method of FIG. 6 includes implementing (701) a software pipeline on the NOC, including segmenting (702) a computer software application into stages, where each stage is implemented as a flexibly configurable module of computer program instructions identified by a stage 1D. In the method of FIG. 6, segmenting (702) a computer software application into stages may be carried out by configuring (706) each stage with a stage 1D for each instance of a next stage. The method of FIG. 6 also includes executing (704) each stage on a thread of execution on an IP block.

In the method of FIG. 6, segmenting (702) a computer software application into stages also may include assigning (708) each stage to a thread of execution on an IP block, assigning each stage a stage 1D. In such an embodiment, executing (704) each stage on a thread of execution on an IP block may include: executing (710) a first stage, producing output data; sending (712) by the first stage the produced output data to a second stage; and consuming (714) the produced output data by the second stage.

In the method of FIG. 6, segmenting (702) a computer software application into stages also may include load balancing (716) the stages, carried out by monitoring (718) the performance of the stages and instantiating (720) a number of instances of each stage in dependence upon the performance of one or more of the stages.

The method of FIG. 6 also includes monitoring (802) software pipeline performance in real time and reconfiguring (804) the software pipeline, dynamically, in real time, and in dependence upon the monitored software pipeline performance.

Figure 7:
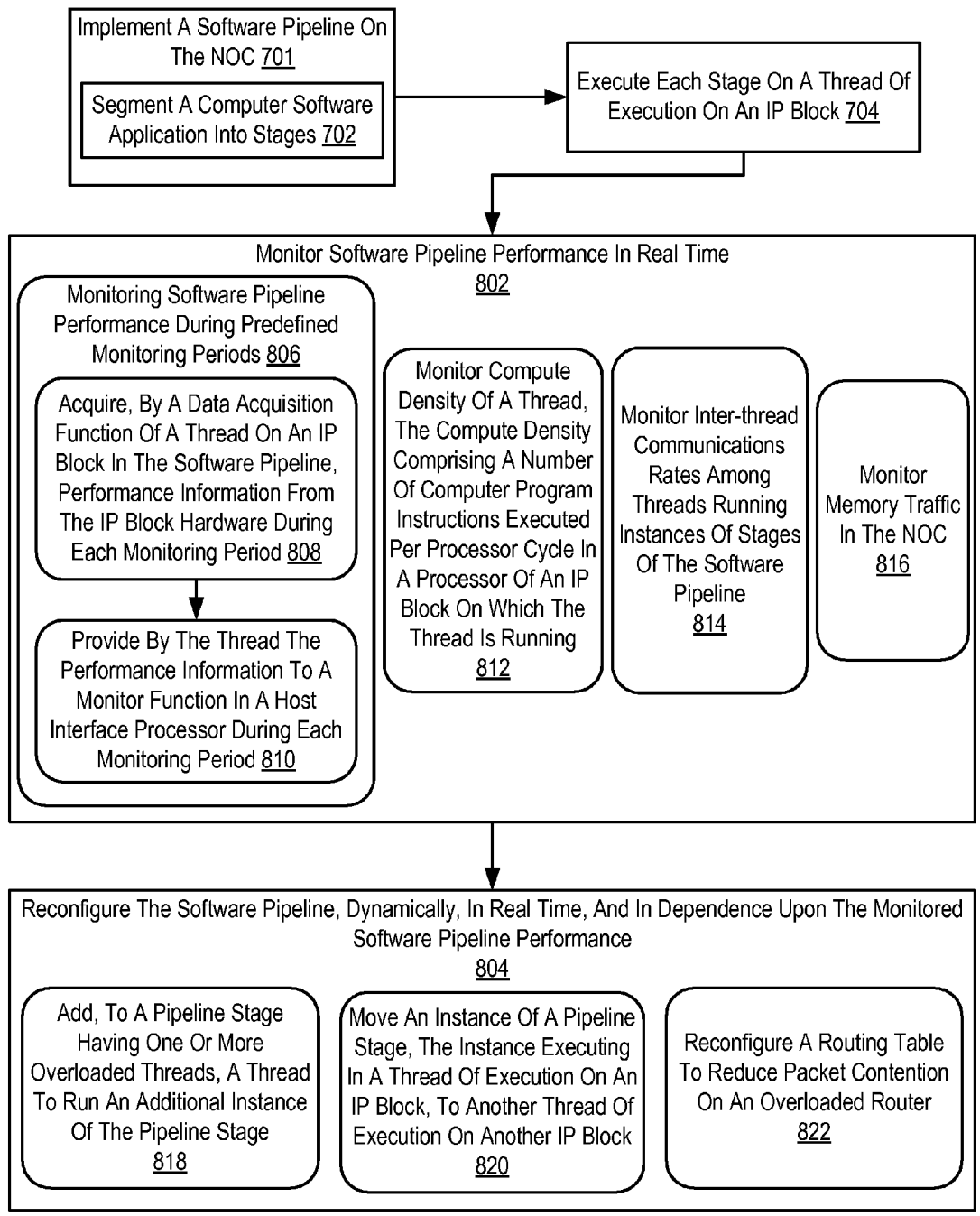
FIG. 7 sets forth a flow chart illustrating a further exemplary method of software pipelining on a NOC according to embodiments of the present invention.

For further explanation, FIG. 7 sets forth a flow chart illustrating a further exemplary method of software pipelining on a NOC according to embodiments of the present invention. The method of FIG. 7 is similar to the method of FIG. 6 including, as it does, implementing (701) a software pipeline on the NOC, including segmenting (702) a computer software application into stages, each stage comprising a flexibly configurable module of computer program instructions identified by a stage 1D, thereby creating a software pipeline; executing (704) each stage of the software pipeline on a thread of execution on an IP block; monitoring (802) software pipeline performance in real time; and reconfiguring (804) the software pipeline, dynamically, in real time, and in dependence upon the monitored software pipeline performance.

The method of FIG. 7, like the method of FIG. 6, is implemented on a NOC similar to the ones described above in this specification, a NOC (102 on FIG. 2) that is implemented on a chip (100 on FIG. 2) with IP blocks (104 on FIG. 2), routers (110 on FIG. 2), memory communications controllers (106 on FIG. 2), and network interface controllers (108 on FIG. 2). Each IP block (104 on FIG. 2) is adapted to a router (110 on FIG. 2) through a memory communications controller (106 on FIG. 2) and a network interface controller (108 on FIG. 2). In the method of FIG. 6, each IP block is implemented as a reusable unit of synchronous or asynchronous logic design used as a building block for data processing within the NOC.

The method of FIG. 7 differs from the method of FIG. 6 in that in the method of FIG. 7, monitoring (802) software pipeline performance in real time may include monitoring (806) software pipeline performance during predefined monitoring periods. In the method of FIG. 7, monitoring (806) software pipeline performance during predefined monitoring periods is carried out by acquiring (808), by a data acquisition function of a thread on an IP block in the software pipeline, performance information from the IP block hardware during each monitoring period and providing (810) by the thread the performance information to a monitor function in a host interface processor during each monitoring period.

In the method of FIG. 7, monitoring (802) software pipeline performance in real time may also include monitoring (812) compute density of a thread, the compute density comprising a number of computer program instructions executed per processor cycle in a processor of an IP block on which the thread is running, monitoring (814) inter-thread communications rates among threads running instances of stages of the software pipeline, and monitoring (816) memory traffic in the NOC.

In the method of FIG. 7, reconfiguring (804) the software pipeline may include adding (806), to a pipeline stage having one or more overloaded threads, a thread to run an additional instance of the pipeline stage, moving (820) an instance of a pipeline stage, the instance executing in a thread of execution on an IP block, to another thread of execution on another IP block, and reconfiguring (822) a routing table to reduce packet contention on an overloaded router.

Exemplary embodiments of the present invention are described largely in the context of a fully functional computer system for software pipelining on a NOC. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of software pipelining on a network on chip ('NOC'), the NOC comprising integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers, the method comprising:

implementing a software pipeline on the NOC, including segmenting a computer software application into stages, each stage comprising a flexibly configurable module of computer program instructions identified by a stage ID;

executing each stage of the software pipeline on a thread of execution on an IP block;

monitoring software pipeline performance in real time;

wherein monitoring software pipeline performance in real time further comprises monitoring software pipeline performance during predefined monitoring periods, including acquiring, by a data acquisition function of a thread on an IP block in the software pipeline, performance information from the IP block hardware during each monitoring period, and providing by the thread the performance information to a monitor function in a host interface processor during each monitoring period and wherein monitoring software pipeline performance in real time includes monitoring inter-thread communications rates among threads running instances of stages of the software pipeline; and reconfiguring the software pipeline, dynamically, in real time, and in dependence upon the monitored software pipeline performance.

2. The method of claim 1 wherein monitoring software pipeline performance in real time further comprises:

monitoring compute density of a thread, the compute density comprising a number of computer program instructions executed per processor cycle in a processor of an IP block on which the thread is running.

3. The method of claim 1 wherein monitoring software pipeline performance in real time further comprises monitoring memory traffic in the NOC.

4. The method of claim 1 wherein reconfiguring the software pipeline further comprises:

adding, to a pipeline stage having one or more overloaded threads, a thread to run an additional instance of the pipeline stage.

5. The method of claim 1 wherein reconfiguring the software pipeline further comprises:

moving an instance of a pipeline stage, the instance executing in a thread of execution on an IP block, to another thread of execution on another IP block.

6. The method of claim 1 wherein reconfiguring the software pipeline further comprises reconfiguring a routing table to reduce packet contention on an overloaded router.

7. A network on chip ('NOC') for software pipelining, the NOC comprising integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers, the NOC comprising:

a software pipeline comprising a computer software application segmented into stages, each stage comprising a flexibly configurable module of computer program instructions identified by a stage ID;

each stage executing on a thread of execution on an IP block;

software pipeline performance on the NOC monitored in real time;

wherein software pipeline performance on the NOC monitored in real time further comprises software pipeline performance on the NOC monitored in real time during predefined monitoring periods, including performance information acquired by a data acquisition function of a thread on an IP block in the software pipeline from the IP block hardware during each monitoring period, the thread performance information provided to a monitor function in a host interface processor during each monitoring period; and wherein software pipeline performance on the NOC monitored in real time further comprises monitored inter-thread communications rates among threads running instances of stages of the software pipeline; and the software pipeline dynamically reconfigured in real time in dependence upon the monitored software pipeline performance.

8. The NOC of claim 7 wherein software pipeline performance on the NOC monitored in real time further comprises:

monitored compute density of a thread, the compute density comprising a number of computer program instructions executed per processor cycle in a processor of an IP block on which the thread is running.

9. The NOC of claim 7 wherein software pipeline performance on the NOC monitored in real time further comprises monitored memory traffic in the NOC.

10. The NOC of claim 7 wherein the software pipeline dynamically reconfigured in real time in dependence upon the monitored software pipeline performance further comprises:

a thread added, to a pipeline stage having one or more overloaded threads to run an additional instance of the pipeline stage.

11. The NOC of claim 7 wherein the software pipeline dynamically reconfigured in real time in dependence upon the monitored software pipeline performance further comprises:

an instance of a pipeline stage, the instance executing in a thread of execution on an IP block, moved to another thread of execution on another IP block.

12. The NOC of claim 7 wherein the software pipeline dynamically reconfigured in real time in dependence upon the monitored software pipeline performance further comprises a routing table reconfigured to reduce packet contention on an overloaded router.

13. A computer program product for software pipelining on a network on chip ('NOC'), the NOC comprising integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers, the computer program product disposed in a computer readable recordable medium, the computer program product comprising computer program instructions capable of:

implementing a software pipeline on the NOC, including
segmenting a computer software application into stages,
each stage comprising a flexibly configurable module of
computer program instructions identified by a stage ID;
executing each stage of the software pipeline on a thread of
execution on an IP block;
monitoring software pipeline performance in real time;
wherein monitoring software pipeline performance in
real time further comprises monitoring software pipeline performance during predefined monitoring periods, including acquiring, by a data acquisition function of a thread on an IP block in the software pipeline, performance information from the IP block hardware during each monitoring period, and providing by the thread the performance information to a monitor function in a host interface processor during each monitoring period and wherein monitoring software pipeline performance in real time includes monitoring inter-thread communications rates among threads running instances of stages of the software pipeline; and
reconfiguring the software pipeline, dynamically, in real time, and in dependence upon the monitored software pipeline performance.

14. The computer program product of claim 13 wherein monitoring software pipeline performance in real time further comprises monitoring software pipeline performance during predefined monitoring periods, including:
  acquiring, by a data acquisition function of a thread on an IP block in the software pipeline, performance information from the IP block hardware during each monitoring period; and
  providing by the thread the performance information to a monitor function in a host interface processor during each monitoring period.

15. The computer program product of claim 13 wherein reconfiguring the software pipeline further comprises:
  adding, to a pipeline stage having one or more overloaded threads, a thread to run an additional instance of the pipeline stage.

16. The computer program product of claim 13 wherein reconfiguring the software pipeline further comprises:
  moving an instance of a pipeline stage, the instance executing in a thread of execution on an IP block, to another thread of execution on another IP block.

* * * * *